(12) United States Patent
Reck

(10) Patent No.: US 9,051,019 B2
(45) Date of Patent: Jun. 9, 2015

(54) TRANSPORT VEHICLE HAVING A THREE-WHEEL CHASSIS

(76) Inventor: Matthias Reck, Ober-Ramstadt (DE)

(*) Notice: Subject to any disclaimer, the term of this patent is extended or adjusted under 35 U.S.C. 154(b) by 0 days.

(21) Appl. No.: 14/344,112

(22) PCT Filed: Aug. 30, 2012

(86) PCT No.: PCT/EP2012/066922
§ 371 (c)(1),
(2), (4) Date: Jul. 1, 2014

(87) PCT Pub. No.: WO2013/037646
PCT Pub. Date: Mar. 21, 2013

(65) Prior Publication Data
US 2014/0311815 A1    Oct. 23, 2014

(30) Foreign Application Priority Data
Sep. 12, 2011 (DE) .................. 10 2011 113 226

(51) Int. Cl.
| | |
|---|---|
| B62D 61/06 | (2006.01) |
| B62K 5/05 | (2013.01) |
| B62K 3/00 | (2006.01) |
| B62K 5/027 | (2013.01) |
| B62K 7/04 | (2006.01) |

(52) U.S. Cl.
CPC . *B62K 5/05* (2013.01); *B62K 3/002* (2013.01); *B62K 5/027* (2013.01); *B62K 7/04* (2013.01); *B62K 2204/00* (2013.01)

(58) Field of Classification Search
CPC ......... B62K 3/002; B62K 5/05; B62K 3/0027
USPC ............ 180/65.1, 65.51, 210, 216, 907, 908; 280/62
See application file for complete search history.

(56) References Cited

U.S. PATENT DOCUMENTS

| | | | | |
|---|---|---|---|---|
| 2,973,048 A | * | 2/1961 | Jensen | 180/216 |
| 3,369,629 A | * | 2/1968 | Morris | 180/208 |
| 3,403,744 A | * | 10/1968 | Dinkel | 180/210 |
| 3,506,080 A | * | 4/1970 | Haddix et al. | 180/214 |
| 4,534,438 A | * | 8/1985 | Mowat et al. | 180/209 |
| 4,641,720 A | * | 2/1987 | Young | 180/6.24 |

(Continued)

FOREIGN PATENT DOCUMENTS

| | | |
|---|---|---|
| DE | 44 44 115 A1 | 6/1996 |
| DE | 198 49 361 A1 | 8/1999 |
| DE | 10 2006 042 119 A1 | 3/2007 |

(Continued)

OTHER PUBLICATIONS

International Search Report for PCT/EP2012/066922 mailed Nov. 5, 2012.

*Primary Examiner* — Paul N Dickson
*Assistant Examiner* — Robert A Coker
(74) *Attorney, Agent, or Firm* — RatnerPrestia

(57) ABSTRACT

The invention relates to a transport vehicle including a three-wheeled carriage, wherein the three-wheeled carriage includes two non-driven front wheels which are coupled to a steering, and a non-jointed rear wheel which is coupled to a drive. In order to provide a transport vehicle which can be used as a replacement for a motorized vehicle for simple transport journeys, it is envisaged that a transport platform be arranged between the axles of the front wheels and the axle of the rear wheel, and that a driver's area be arranged in front of the transport platform as viewed in the direction of travel.

2 Claims, 4 Drawing Sheets

(56) References Cited

U.S. PATENT DOCUMENTS

| | | | | |
|---|---|---|---|---|
| 4,729,447 | A * | 3/1988 | Morse | 180/65.1 |
| 2002/0125709 | A1* | 9/2002 | Wu | 280/771 |
| 2006/0054370 | A1* | 3/2006 | Sugioka et al. | 180/211 |
| 2010/0013183 | A1* | 1/2010 | He | 280/210 |

FOREIGN PATENT DOCUMENTS

| | | |
|---|---|---|
| DE | 10 2007 062 017 A1 | 6/2009 |
| WO | WO 87/02633 | 5/1987 |
| WO | WO 01/92082 A1 | 12/2001 |
| WO | WO 2005/058681 A1 | 6/2005 |

* cited by examiner

TRANSPORT VEHICLE HAVING A THREE-WHEEL CHASSIS

CROSS REFERENCE TO RELATED APPLICATIONS

This application is the U.S. National Phase Application of PCT/EP2012/066922, filed Aug. 30, 2012, which claims priority to German Patent Application No. 10 2011 113 226.4, filed Sep. 12, 2011, the contents of such applications being incorporated by reference herein.

FIELD OF THE INVENTION

The invention relates to a transport vehicle comprising a three-wheeled carriage.

BACKGROUND OF THE INVENTION

DE 4 444 115 A1 discloses a single-occupant light vehicle comprising a three-wheeled carriage, wherein the three-wheeled carriage comprises two non-driven front wheels which are coupled to a steering, and a non-jointed rear wheel which is coupled to a drive. The rear wheel is driven via a pedal crank together with a chain drive. A battery-powered electric drive can be additionally provided. The two front wheels comprise an independent wheel suspension with a double wishbone. All three wheels feature an inclination of the wheels for cornering. The vehicle can comprise full panel covering. A driver's area is arranged between the axles of the front wheels and the axle of the rear wheel, wherein a recumbent position is envisaged for the driver. An arrangement for additional luggage is not described.

DE 10 2006 042 119 A1 discloses a load scooter comprising an essentially comparable three-wheeled carriage. This three-wheeled carriage also comprises two non-driven front wheels which are coupled to a steering, and a non jointed rear wheel which is coupled to a drive. It is additionally known from www.constin.de that the drive of the rear wheel can be embodied as an electric drive. A transport platform is situated above the axle of the front wheels. A driver's area is arranged behind it, as viewed in the direction of travel, wherein an upright position is envisaged for the driver.

DE 10 2007 062 017 A1 discloses a multi-functional ground conveyor comprising a three-wheeled carriage. Various variants of an electric drive are described for the drive. With regard to the steering, however, the single wheel is always described as a jointed wheel, and the two laterally spaced wheels are always described as non-jointed wheels. A driver's area is provided between the axle of the single wheel and the axles of the two laterally spaced wheels, wherein an upright position is envisaged for the driver. A trailer device is arranged at the rear end of the vehicle, and an additional work apparatus, such as for example a load fork, can be fastened to the front end of the vehicle.

SUMMARY OF THE INVENTION

Although transport vehicles comprising a three-wheeled carriage are correspondingly known in principle, they have hitherto not yet been able to establish themselves as a replacement for conventional motorised vehicles for simple transport journeys.

Therefore an aspect of the invention provides a transport vehicle which can be used as a replacement for a motorised vehicle for simple transport journeys.

This aspect is achieved by a transport vehicle comprising a three-wheeled carriage, wherein the three-wheeled carriage comprises two non-driven front wheels which are coupled to a steering, and a non-jointed rear wheel which is coupled to a drive, wherein a transport platform is arranged between the axles of the front wheels and the axle of the rear wheel, and in that a driver's area is arranged in front of the transport platform as viewed in the direction of travel, wherein a steering rod is provided for operating the steering, and wherein the steering rod is mounted rigidly in the direction of travel and mounted such that it can be inclined transverse to the direction of travel.

The solution in accordance with the invention is characterised in that a transport platform is arranged between the axles of the front wheels and the axle of the rear wheel, and in that a driver's area is arranged in front of the transport platform as viewed in the direction of travel.

A particular advantage of the invention is that it combines a three-wheeled carriage—which comprises two non-driven front wheels which are coupled to a steering, and a non-jointed rear wheel which is coupled to a drive—with an arrangement of the weights which also enables transport weights to be additionally loaded which are significantly over the weight of the driver.

The driver's area is preferably situated just behind the axle of the front wheels. The load on the jointed front wheels thus mainly consists of the weight of the driver. At the same time, the driver has a clear view while driving.

The transport platform, by contrast, is situated behind the driver's area. The load on the non-jointed rear wheel thus mainly consists of the transport weights. In this arrangement, additional loads in the range of for example 100 kg can be added without any problems.

The transport vehicle in accordance with the invention is thus a vehicle which enables bulky and heavy goods to be transported over short distances in an energy-saving, quick and uncomplicated way. Despite the known vehicles comprising a three-wheeled carriage, these transports have hitherto always still been performed using motorised vehicles. Using the invention, it is now possible to transfer many transport applications to the transport vehicle in accordance with the invention. Typical applications include transports in the range of 100 kg in a domestic setting or on factory and/or trade fair premises. The following applications are in particular conceivable:

shopping, for example crates of drinks, larger purchases;
transport on trade fair premises, for example advertising documentation, tools;
transport on factory premises, for example PCs, tools, components or sub-assemblies;
catering, for example on factory premises or in urban settings (meals on wheels, transporting beer barrels, etc.);
airports, for example transporting people or luggage;
ports and marinas, for example transporting ropes, replacement parts.

Using a three-wheeled carriage simplifies the design of the drive train, since a single driven rear wheel does not require a differential. The vehicle always stands securely on three wheels, wherein irregularities in the road surface are compensated for without any elaborate spring suspension. Both front wheels are braked. The three-wheeled carriage can otherwise also be provided with the features—in particular, an inclination of the wheels—such as are known from DE 4 444 115 A1 for single-occupant light vehicles.

Another preferred embodiment envisages the transport platform comprising a horizontal storage area, wherein the distance between the horizontal storage area and the ground is less than the diameter of the two identically formed front wheels. The transport platform therefore exhibits a low centre of gravity. Preferably, the distance of the storage area is even less than the radius of the two identically formed front wheels, wherein the distance from the ground can typically measure 10 cm to 15 cm. The storage area can exhibit the size of standardised transport boxes, for example 400 mm by 600 mm. The transport goods can thus be transported in standardised transport boxes which can be stacked and fixed using stop brackets and luggage ties. It is also possible to optionally provide fastening systems and/or fixing systems (for example made of aluminium profiles), connections for seats (for example child seats or patient seats), retaining systems for crates of drinks or additional fastening eyes on the storage area.

Another preferred embodiment envisages the drive being formed as an electric drive. The use of the transport vehicle in accordance with the invention is thus also furthered by the fact that electric mobility is gaining ever-increasing significance. Due to new battery technologies and drive techniques, the corresponding electric drives are becoming more and more efficient.

As already mentioned, both front wheels are braked. It is additionally possible, when the brake levers are operated, for the electric drive to likewise brake and feed energy back into the battery (recuperation). At an additional load of for example 100 kg, the maximum speed of the transport vehicle in accordance with the invention is typically around 25 km/h. Another preferred embodiment envisages the electric drive comprising a battery and a control logic which are arranged below the transport platform, and an electric motor which is formed as a hub motor. In this way, the relatively heavy battery is also situated in the region of the transport platform, thus further assisting the advantageous weight displacement.

Another preferred embodiment envisages the operating elements for the steering and the drive being arranged such that the driver assumes an upright position. Since the transport vehicle in accordance with the invention generally only has to cover relatively short journeys, the driver can assume an upright position, preferably a standing position, while driving. This enables space to be saved in the direction of travel. It is however also conceivable for a seat to be provided for the driver or for the driver to use the transport boxes which are stacked on the transport platform as a seat.

Another preferred embodiment envisages a steering rod being provided for operating the steering, wherein the steering rod is mounted rigidly in the direction of travel and mounted such that it can be inclined transverse to the direction of travel. Inclining the steering rod transverse to the direction of travel automatically displaces the weight of the driver towards the middle of the curve, thus displacing the driver counter to the centrifugal force. Since the steering rod is mounted rigidly in the direction of travel, the driver can also support him/herself on the steering rod during accelerating or braking. This steering technique enables the driver to drive with one hand and still have a secure footing. The steering rod can be embodied in a T-shape or merely as a simple rod. The drive can be operated via a turning handle, a thumb lever, an on/off switch or also via a foot pedal. A brake lever or also a foot pedal can be provided for operating the brake.

BRIEF DESCRIPTION OF THE DRAWINGS

Further details and advantages of the invention shall now be described on the basis of the figures, which show.

DETAILED DESCRIPTION OF THE INVENTION

Figure 1:
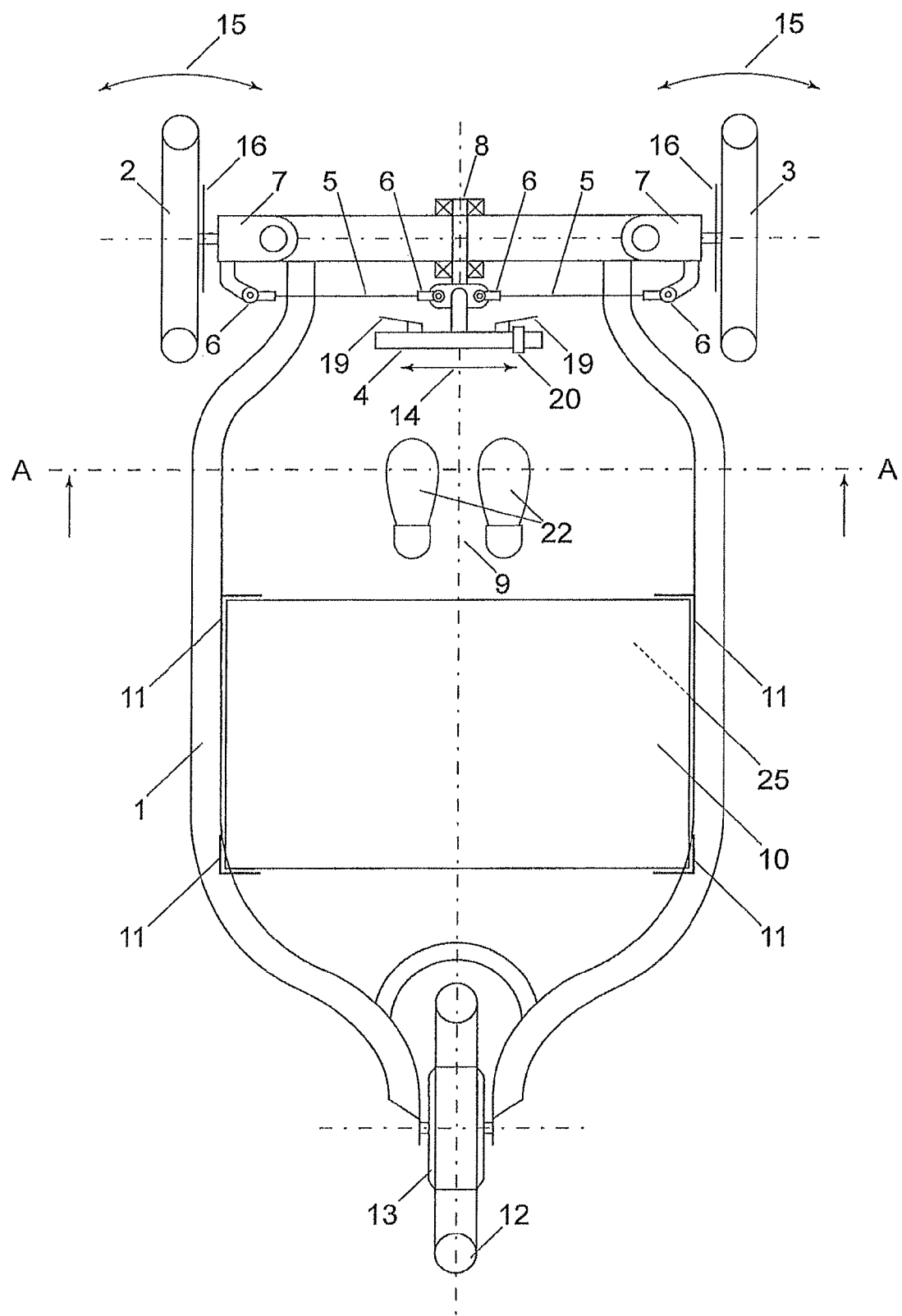
FIG. 1 a top view of the transport vehicle in accordance with the invention.

FIG. 1 shows a top view of the transport vehicle in accordance with the invention. The transport vehicle in accordance with the invention comprises the following essential components: the two front wheels 2 and 3; the steering rod 4; the rear wheel 12 together with the hub motor 13; the driver's area 9 for the driver 22; and the transport platform 25 in the middle of the frame 1. The driver's area 9 and the transport platform 25 can be formed as a common area.

The two steerable front wheels 2 and 3 are each fastened to an axle arm 7 which can be articulated. The two axle arms 7 are each connected, via a ball joint 6 and a push rod 5 in each case, to another respective ball joint 6 on the steering rod 4. The movement 14 of the steering rod 4, which is mounted about the steering axis 8, moves the two front wheels to the right and left in the direction 15.

The speed of the vehicle can be controlled via the throttle 20, and the switch 21 serves to invert the direction. The disc brakes 16 can be operated via the handbrake lever 19.

The transport platform 25 comprises fastening brackets 11 which can fix standardised transport boxes 10.

Figure 2:
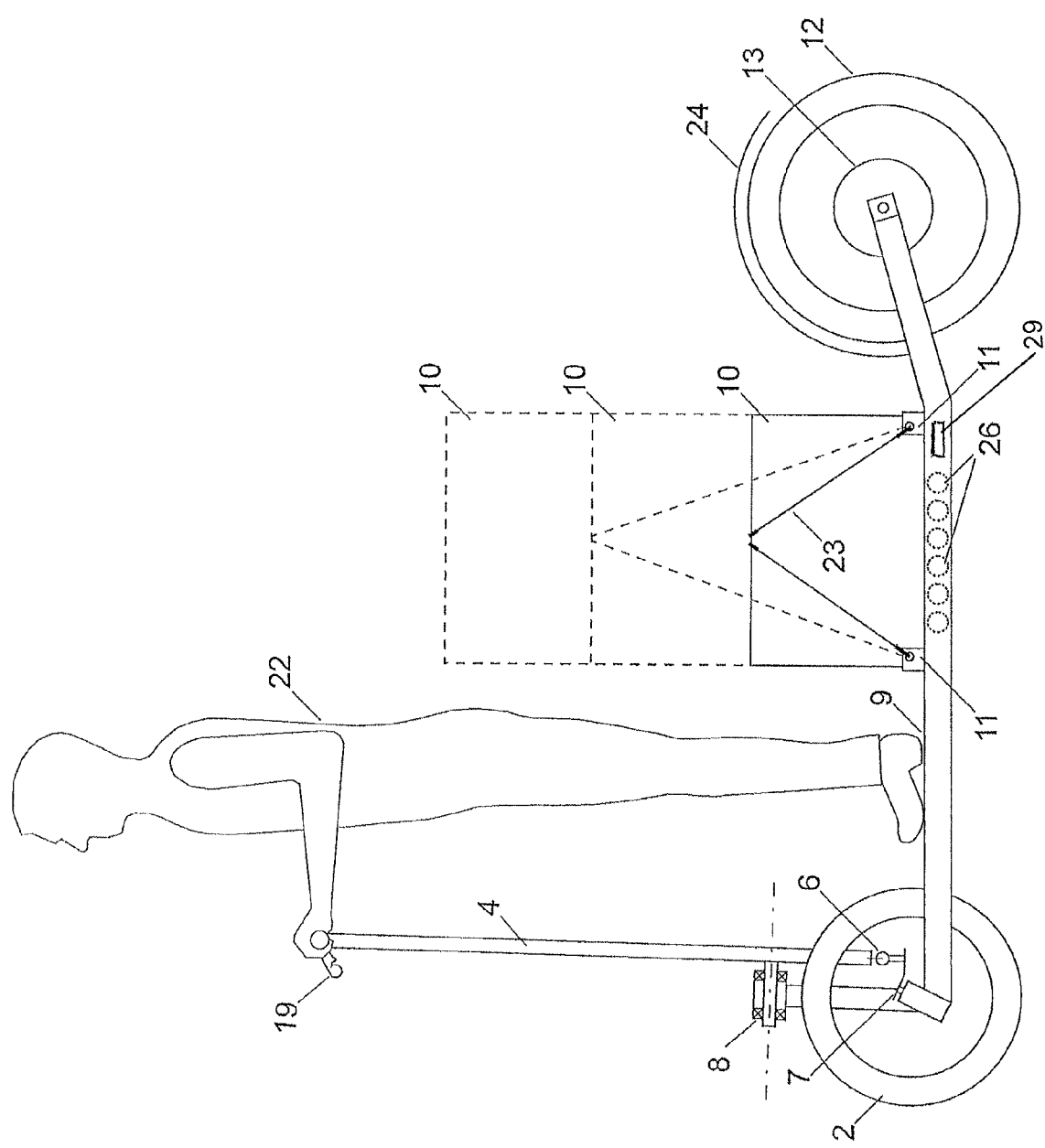
FIG. 2 a lateral view of the transport vehicle in accordance with the invention.

FIG. 2 shows a lateral view of the transport vehicle in accordance with the invention. The driver 22 stands on the driver's area 9 and can decelerate the vehicle using the brake levers 19. Standardised transport boxes 10 can also be multiply stacked and fastened using luggage ties 23. The driver 22 stands in front of the transport boxes 10; the drive motor 13 is situated in the rear of the vehicle. The batteries 26 of the drive train and control logic 29 are situated in an intermediate level of the frame 1, directly under the load which is stored in the transport boxes 10. Arranging the driver 22, the transport boxes 10, the batteries 26, control logic 29 and the motor 13 one directly behind the other achieves a very uniform load distribution and high resistance to tipping during braking.

Figure 3:
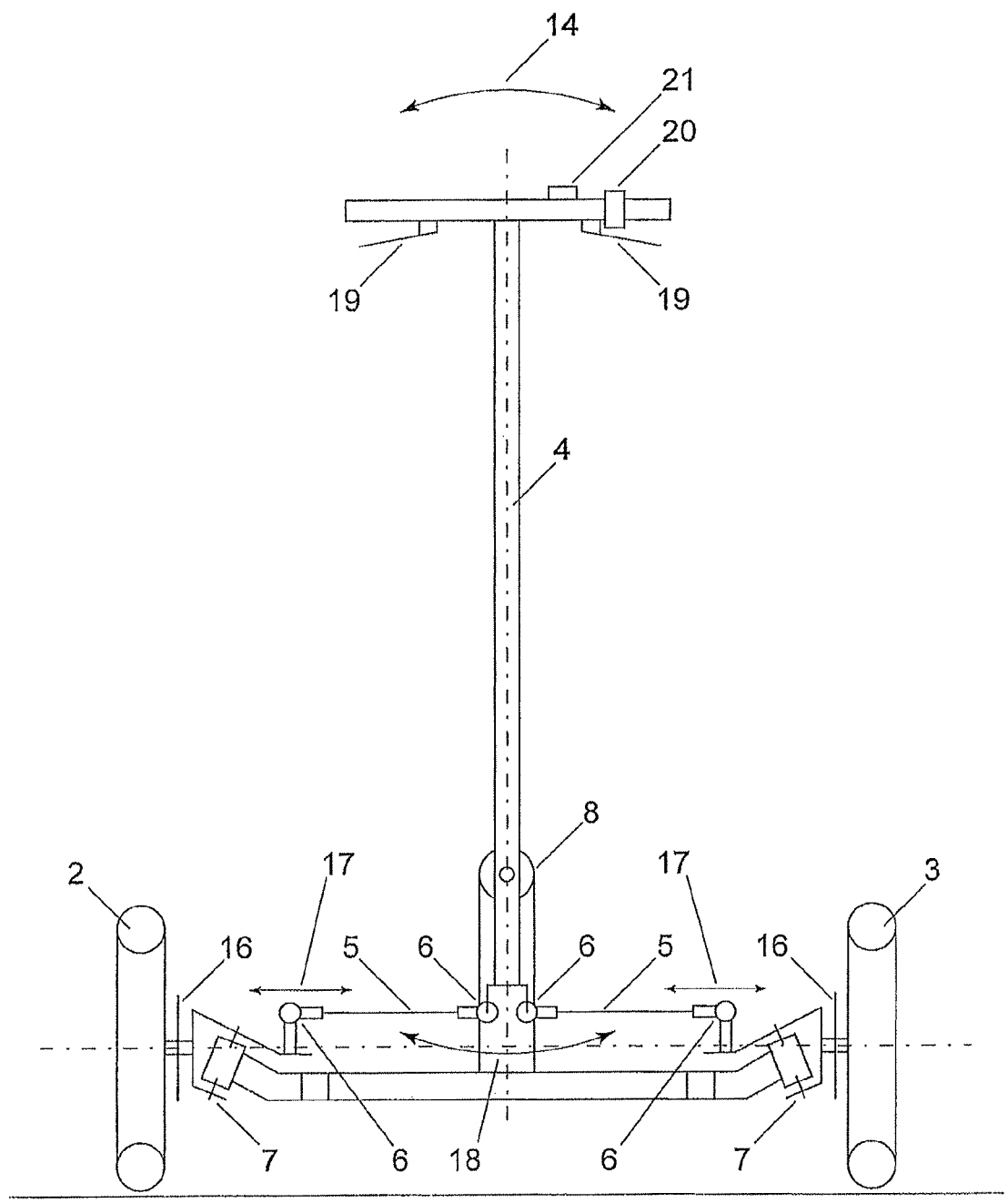
FIG. 3 a section along the line A-A in FIG. 1.

FIG. 3 shows a section along the line A-A in FIG. 1. This reveals a preferred embodiment of the steering mechanism in detail. As already described in FIG. 1, the two steerable front wheels 2 and 3 are each fastened to an axle arm 7 which can be articulated. The axle arms 7 are connected, via a ball joint 6 and a push rod 5 in each case, to another respective ball joint 6 on the steering rod 4. The movement 14 of the steering rod 4, which is mounted about the steering axis 8, moves the lower part of the steering rod inversely with respect to the movement 14 in the direction 18; the two front wheels are thus then moved to the right and left in the direction 15. Other embodiments of articulation would be enabled by for example a rotational movement of the steering rod 4 about its vertical axis or a non-inverting inclination, in that the articulating levers of the axle arms 7 would point forwards rather than backwards.

Figure 4:
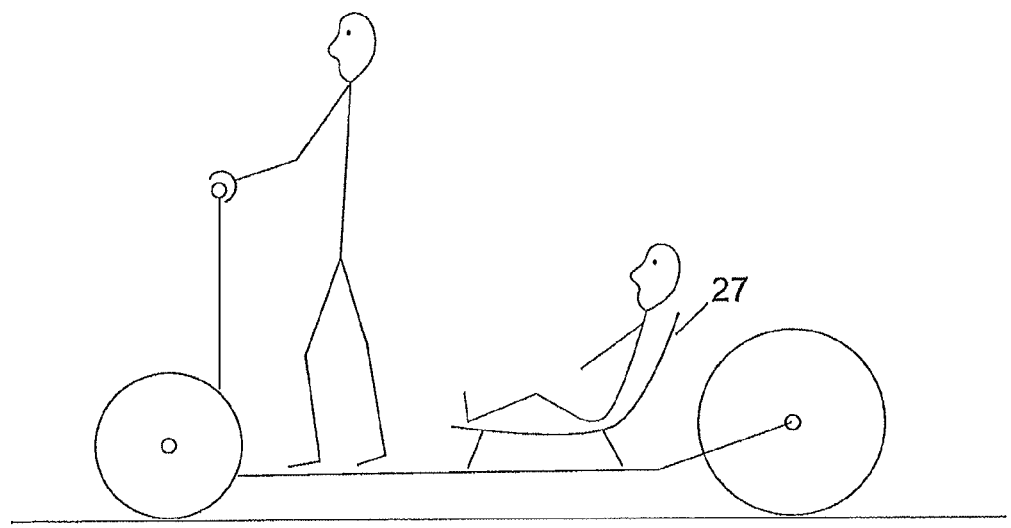
FIG. 4 a variant of the transport vehicle in accordance with the invention, comprising a transport seat.

FIG. 4 shows a variant of the transport vehicle in accordance with the invention, comprising a transport seat 27. The transport seat can be configured for an adult or also as a child seat. It is also possible to provide a plurality of seats next to each other. The seats can for example be attached using a variable fastening system such as is shown in FIG. 6.

Figure 5:
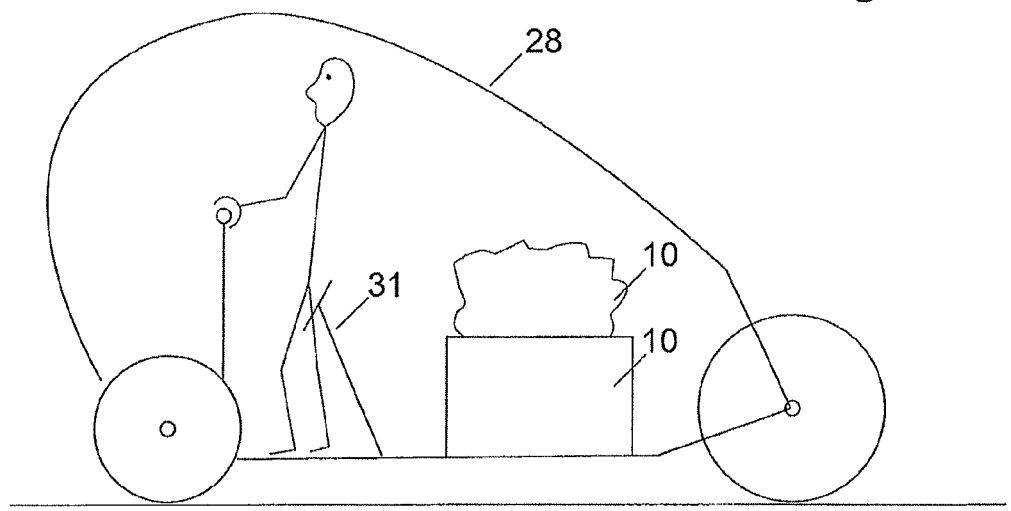
FIG. 5 a variant of the transport vehicle in accordance with the invention, comprising a rain cover and a saddle support.

FIG. 5 shows a variant of the transport vehicle in accordance with the invention, comprising a rain cover and a saddle support. The rain cover 28 is fastened to the frame 1. It can be attached or detached as required. A saddle support 31 is provided for the driver, on which the driver can support him/herself.

Figure 6:
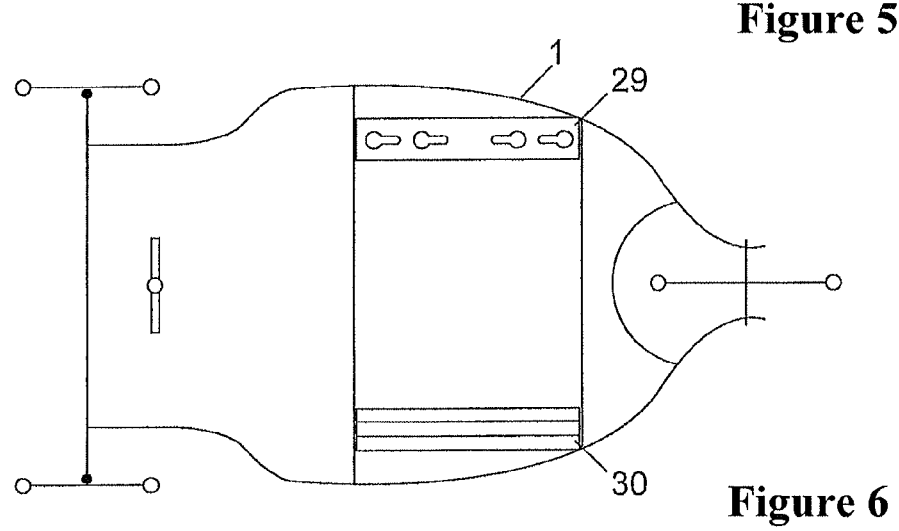
FIG. 6 a variant of the transport vehicle in accordance with the invention, comprising a fastening system on the transport platform.

FIG. 6 shows a variant of the transport vehicle in accordance with the invention, comprising a fastening system on the transport platform. The fastening system is preferably embodied as a variable fastening system, for example in a keyhole embodiment for hooking-in luggage ties or in a T-slot embodiment 30 for fastening with T-nuts and screws. These two variants are merely cited as an example; any other types of fastening (for example fastening eyes, retaining brackets or quick-release fasteners) can also be provided.

The invention claimed is:

1. A transport vehicle comprising a three-wheeled carriage, wherein the three-wheeled carriage comprises two non-driven front wheels which are coupled to a steering, and a non-jointed rear wheel which is coupled to a drive, wherein a transport platform is arranged between the axles of the front wheels and the axle of the rear wheel, and in that a driver's area is arranged in front of the transport platform as viewed in the direction of travel, wherein a steering rod is provided for operating the steering, and wherein the steering rod is mounted rigidly in the direction of travel and mounted such that it can be inclined transverse to the direction of travel, wherein the drive is formed as an electric drive and the electric drive comprises a battery and a control logic which are arranged below the transport platform, and an electric motor which is formed as a hub motor.

2. The transport vehicle according to claim 1, further comprising a handbrake lever, throttle and switch, wherein the steering rod, the handbrake lever, the throttle and the switch are arranged such that the driver assumes an upright position.

* * * * *